(12) United States Patent
Camwell et al.

(10) Patent No.: US 8,115,651 B2
(45) Date of Patent: Feb. 14, 2012

(54) DRILL STRING TELEMETRY METHODS AND APPARATUS

(75) Inventors: Paul L. Camwell, Calgary (CA); James M. Neff, Okotoks (CA); Derek W. Logan, Calgary (CA)

(73) Assignee: XACT Downhole Telemetry Inc., Calgary, Alberta (CA)

( * ) Notice: Subject to any disclaimer, the term of this patent is extended or adjusted under 35 U.S.C. 154(b) by 978 days.

(21) Appl. No.: 12/082,530

(22) Filed: Apr. 11, 2008

(65) Prior Publication Data

US 2008/0253228 A1 Oct. 16, 2008

Related U.S. Application Data

(60) Provisional application No. 60/907,694, filed on Apr. 13, 2007.

(51) Int. Cl.
*G01V 3/18* (2006.01)
(52) U.S. Cl. ............... 340/853.2; 340/853.3; 340/854.9
(58) Field of Classification Search .............. 340/853.2, 340/853.3, 854.9; 367/82
See application file for complete search history.

(56) References Cited

U.S. PATENT DOCUMENTS

| 4,912,461 | A | * | 3/1990 | Cenzano et al. | 370/394 |
| 5,160,925 | A | | 11/1992 | Dailey | |
| 6,177,882 | B1 | | 1/2001 | Ringgenberg | |
| 6,816,082 | B1 | * | 11/2004 | Laborde | 340/853.3 |
| 7,612,686 | B1 | * | 11/2009 | Bustamante et al. | 340/850 |

OTHER PUBLICATIONS

Grover, Wayne D., et al. "Development and Performance assessment of a Distributed Asynchronous Protocol for Real-Time Network Restoration", IEEE Journal on Selected Areas in Communications, 9(1):112-125, Jan. 1991.

* cited by examiner

*Primary Examiner* — Giovanna Wright
(74) *Attorney, Agent, or Firm* — Klarquist Sparkman, LLP

(57) ABSTRACT

A method is provided which transmits information using a plurality of data transmission nodes situated along a drill string. In this method, a first node obtains a transmission status of a second node. When the transmission status of the second node indicates that the second node meets a selected performance threshold, information is sent from the first node to the second node. When the transmission status of the second node indicates that the second node does not meet its performance threshold, then the first node obtains a transmission status of a third node. When the transmission status of the third node indicates that the third node meets a selected performance threshold, information is transmitted from the first node to the third node for relaying along the drill string.

21 Claims, 7 Drawing Sheets

DRILL STRING TELEMETRY METHODS AND APPARATUS

CROSS REFERENCE TO RELATED APPLICATION

This application claims the benefit of U.S. Provisional Patent Application No. 60/907,694, filed Apr. 13, 2007, which is incorporated herein by reference.

FIELD

The disclosed technology relates to a drill string telemetry method and apparatus.

BACKGROUND

Measurement-while-drilling (MWD) and Logging-while-drilling (LWD) systems are examples of surveying and well-logging procedures that may be used to provide information on the conditions at the drill bit, properties of the geologic formations being drilled, etc. This information may be stored for later retrieval, or transmitted via telemetry uphole to the operator at the surface, and used to guide and optimize the drilling process. Rotary Steering Tools (RST) are commonly used to steer well trajectories and require control signals and/or data to be transmitted from surface to the down hole tool.

Various forms of telemetry may be used in drilling and well-logging to transmit control and data signals downhole, and transmit the information collected by the downhole sensors uphole, including mud-pulse telemetry, hard wire connections, acoustic telemetry systems, electromagnetic (EM) telemetry, and the like. These sensors may be disposed predominantly at the downhole end of the drillstring. In a shallower or shorter well, the data may be conveyed without requiring signal boost or amplification.

In a deeper or longer well, it may be necessary to extend the range of the transmitter apparatus used to get information to or from the surface. In order to maintain an adequate signal-to-noise ratio to preserve signal quality along the transmission path, devices to boost signal strength, or repeaters, may be required.

A problem may arise in a system having repeaters or similar units for re transmission of signals when one of the units ceases to function within normal parameters. The unit may fail outright or may scramble the signal upon retransmission, sending only useless signals. With a weak or broken link in the transmission chain, the drilling operators may be effectively blind, with no way to determine where the problem is, what the problem is, whether it is an equipment failure or a temporary signal disruption due to geologic or other seismic conditions surrounding the drill string or the like.

In order to minimize the disruption in the well-drilling process, systems and methods that enable development of alternate data transmission routes in a drill string while operating are desired.

SUMMARY

The technology disclosed herein relates to drill string telemetry methods and apparatus used in well drilling.

Among the disclosed embodiments is a method for transmitting information using a plurality of data transmission nodes situated along a drill string. In this method, a first node obtains a transmission status of a second node. When the transmission status of the second node indicates that the second node meets a selected performance threshold, information is sent from the first node to the second node. When the transmission status of the second node indicates that the second node does not meet its performance threshold, then the first node obtains a transmission status of a third node. When the transmission status of the third node indicates that the third node meets a selected performance threshold, information is transmitted from the first node to the third node for relaying along the drill string. When the transmission status of the third node indicates that the third node does not meet its performance threshold, then the first node can obtain a transmission status of an Nth node, wherein the Nth node has at least as many nodes interposed between itself and the first node as there are nodes interposed between the first node and the third node. When the transmission status of the Nth node indicates that the Nth node meets a selected performance threshold, then information is transmitted from the first node to the Nth node for relaying along the drill string.

In the above method, the first node can be adjacent to the second node and to the third node on the drill string. Alternatively, the first node can be adjacent to the second node on the drill string, and the third node has at least one node interposed between it and the first node on the drill string.

Another disclosed embodiment is a data transmission node for conveying information along a drill string. The node comprises: a transmitter for transmitting information to another node, a receiver for receiving a transmission status of another node, and a controller with a memory having encoded thereon an algorithm that performs the steps of the above method.

In another embodiment, a drill string comprises a plurality of data transmission nodes situated along the drill string wherein at least one of the nodes includes a controller with a memory having encoded thereon an algorithm that performs the steps of the above method. At least one of the nodes can also comprise a sensor package for obtaining data on a wellbore surrounding the drillstring. The node having the sensor package adds the data to the information being relayed along the drill string for transmission along the drill string. At least one of the nodes that comprises a sensor package can also comprise data storage capability for storing data obtained using the sensor package.

One of the second or third nodes is considered to be below its selected performance threshold when the node is unable to communicate, or when the power output of the node falls below a selected level, or when the node detects a failure in one or more sensors in the node, or when the node detects a temporary electronic circuit failure.

The step of sending the information from the first node to the third node can comprise one or more of (1) increasing the transmitter power of the first node to a level that a transmission by the first node is receivable by the third node (2) increasing the time of which each data bit is transmitted in a transmission by the first node to the third node, and (3) waiting for a relatively quiet period in drilling then transmitting the information by the first node to the third node.

The transmission status of the second node can comprise a unique address tag and a status tag. Each node can add its own transmission status to the information being relayed along the drill string for transmission along the drill string. The status tag can consist of information selected from the group of whether the battery supply of the node is viable, whether the node is receiving all expected data, and whether the power output of the node is sufficient.

The step of obtaining a transmission status of the second node by the first node can comprise the second node spontaneously and periodically sending to the first node the transmission status of the second node. Alternatively, the first node can periodically request the transmission status of the second node and in response to periodic requests, the second node will send the transmission status of the second node to the first node.

The step of sending the information from the first node to another node can be carried out by one of acoustic telemetry, mud pulse telemetry, and electromagnetic telemetry. Also, the step of obtaining the transmission status of another node by the first node can be carried out by one of acoustic telemetry, mud pulse telemetry and electromagnetic telemetry.

This summary does not necessarily describe all features of the disclosed technology. Other aspects and features of the technology will become apparent to those of ordinary skill in the art upon review of the following description.

BRIEF DESCRIPTION OF THE DRAWINGS

These and other features of the disclosed technology will become more apparent from the following description in which reference is made to the appended drawings wherein.

DETAILED DESCRIPTION

Figure 1:
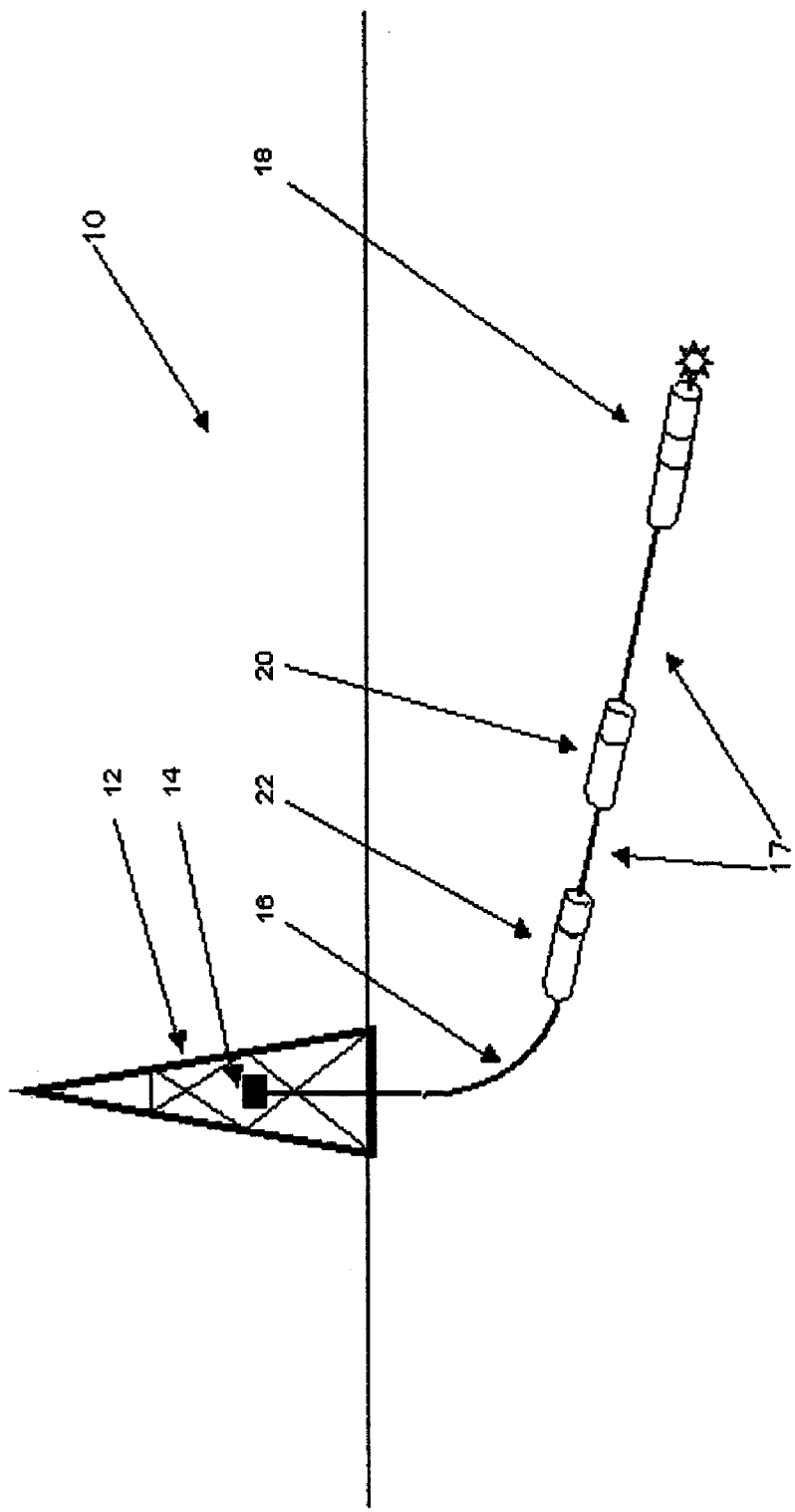
FIG. 1 shows an exemplary drilling and communication system including a bottom hole assembly and two nodes arranged sequentially along a drill string (Prior Art).

In the description that follows, a number of terms are used extensively; the following definitions are provided to facilitate understanding of various aspects of the disclosed technology. Use of examples in the specification, including examples of terms, is for illustrative purposes only and is not intended to limit the scope and meaning of the embodiments described herein herein.

Terms such as 'down', 'downhole', 'lower', bottom-hole', 'below' and the like are used in reference to the position in the well, where the bottom of the well is the most distal point drilled along the well path, relative to the surface. Similarly, terms such as 'above', 'uphole', 'upper' and the like refer to a position in the well path closer to the surface. A well path may be drilled at a range of angles, from vertical to horizontal, and any in between, and the angle of drilling may be altered as the well path progresses through the substrate. Terms, unless specifically indicated, should not be construed to relate to depth or position relative to vertical, but to the position relative to the lowermost point, or bottom, of the well.

Terms such as "data", "information", "signal" and the like may be used interchangeably to refer to control signals or the digital information gathered or generated by sensor packages and tools according to various embodiments of the disclosed technology, and also to the digital information received and transmitted by the nodes of the system, according to various embodiments of the disclosed technology.

Transmission of data or signals according to methods and systems comprising embodiments of the disclosed technology may be unidirectional, or bidirectional, and in an uphole or downhole direction. Some exemplary descriptions may be provided, illustrating transmission events in one direction—these are for illustration purposes only and are not to be considered as limiting.

During the process of drilling a well, a variety of measurements are taken and conditions are logged, along the drillstring, at the site of the downhole drill bit, along the wellbore (in some drilling events) and at the surface. Measurement-while-drilling (MWD) and logging-while-drilling (LWD) systems employ a variety of specialized tools and sensors to gather the relevant data point, and this information is conveyed uphole to the surface, where a drill rig operator may use this information to steer the well, alter the drill speed, alter the mud flow or the like. The drill bit itself may comprise instrumentation to record the condition of the drill bit while in use. Additionally Rotary Steering Tools (RST) may also be used to steer the well and require control signals and/or data sent from the surface.

Sensors and tools used for MWD may be used to provide information about the conditions at or near the drill bit, for example, directional information, WOB/TOB (weight-on-bit/torque-on-bit), inclination of the wellbore, rotational speed of the drillstring, downhole temperature, pressure, type and severity of downhole vibration, mud flow volume, flow rate of product, smoothness of the drillbit rotation, and the like.

A suite of tools records various parameters of the geologic strata while being drilled using LWD. Examples of such parameters include geological formation properties and geophysical measurements such as Natural Gamma Ray (average gamma ray, gamma ray spectrometry for potassium, thorium, uranium, etc), focused gamma ray+360° images); Electrical environment (spontaneous potential, phase shift resistivity, attenuation resistivity, focusing electrode logs (Laterolog devices)+360° images, Induction logs); Density & Porosity (Bulk density logs+360° images, Neutron Porosity, Neutron Gamma Spectroscopy, Thermal Neutron Decay time, Photo-Electric Factor, Ultra Sonic Caliper+360° images); Nuclear Magnetic Resonance (NMR) (Porosity, Permeability, Free and Bound Fluids); Acoustic (Sonic) response (Compressional Slowness ($\Delta tc$); Shear Slowness ($\Delta ts$); Estimated Porosity); Seismic While Drilling (SWD) (Drillbit-SWD, VSP-WD (Vertical Seismic Profile While Drilling)); Formation Pressure (Fluid type, Permeability), and the like.

As the MWD and LWD information is logged, it may be stored for later retrieval when the drillstring is pulled up. Alternately, the data can be communicated uphole or downhole without disturbing the drilling process where it may be used to guide geosteering, adjust drilling mud flow rate or pressure, confirm direction and location and the like.

Several telemetry methods are known and in current use in drilling operations to convey data in both uphole and downhole directions. Mud Pulse Telemetry, or mud pressure pulse transmission, employs variations in pressure in the drilling mud to transmit signals from the bottom hole assembly to the surface. The variations in pressure may be sensed and analyzed by a computer at the surface, to provide the data stream. Mud pressure pulse transmission may be slow, generally in the range of 1-10 bits per second.

Acoustic telemetry employs an acoustic signal generated at surface, at or near the bottom hole assembly, or other location of interest, that is transmitted through the drillpipe along the drill string, mud column and/or the geologic strata surrounding the wellbore. Transmitted sound waves are detected uphole, for example at or near the surface, or downhole, and may be interpreted by a computer to discern information relating to data or control signals originating from uphole or the conditions downhole. Under some conditions, acoustic signals may be distorted or otherwise interfered with by the drilling equipment itself, and detection may be problematic in deeper wells due to signal attenuation, scattering and distortion.

Insulated hard wire connections from the bottom hole assembly to the surface data collection site that provide a physical communication link between the nodes may also be used for downhole and surface signal transmission. A high transmission rate may be possible, and the system is not as sensitive to distortion, attenuation or scattering compared to acoustic transmission or mud pressure pulse.

Electromagnetic (EM) telemetry is capable of transmitting data up to ten time times faster than mud pulse telemetry. EM telemetry employs electromagnetic waves to transmit through the ground, where they may be detected and recorded by a receiver at the surface, or at another point along the drill string. Ground and electrochemical effects, and attenuation over distance may limit the use of EM telemetry in deep wells unless a repeater or retransmission event is involved.

Multiple forms of telemetry may be used in a drilling and communication system. For example, Ringgenberg et al in U.S. Pat. No. 6,177,882 describe electromagnetic-to-acoustic and acoustic-to-electromagnetic repeaters that may be incorporated in a drilling and communication system according to some aspects of the disclosed technology. Other examples of telemetry signal interconversion may include mud-pulse-to-acoustic, acoustic-to-mud-pulse, mud-pulse-to-electromagnetic, electromagnetic-to-mud pulse, or the like. In still other examples, a hardwire link may connect some or all of the repeaters in a system, to relay the data from one to another.

Regardless of the telemetry means, surface and downhole systems that provide 'real-time' communications between the bottom hole assembly deep in the wellbore and the control site at the surface are key components for safe and efficient operation of a drilling rig. Continuous monitoring of the drill motors, monitoring and control of RST systems, drill bit, geological and geophysical parameters, position of the bottom hole assembly and direction of drilling allows for a timely response to any control problems or aberrant conditions. Drilling control may be optimized and, particularly for non-vertical wells, improved well steering and directional surveying may be achieved.

Drilling rigs, drill strings and associated apparatus involved in drilling oil or gas wells are known in the art. Referring now to FIG. 1 (prior art), an exemplary drilling and communication system including a bottom hole assembly and two nodes arranged sequentially along a drill string is shown generally at 10. A drilling rig 12, incorporating a telemetry apparatus (including a surface receiver, not shown) 14 is connected to a surface end of a drill string 16. The telemetry apparatus 14 at the surface may also be referred to more generally as a node. The drill string 16 includes lengths of drill pipe 17 and a bottom hole assembly 18 at a downhole or distal end of the drill string where the drilling process occurs. Transition pipe, drill collars and the like (not shown) to facilitate the process of drilling may also be included in a drill string. At intermediary intervals along the drill string 16, a plurality of nodes may be positioned. In the example shown in FIG. 1, only two nodes 20, 22 are shown for clarity.

Figure 2:
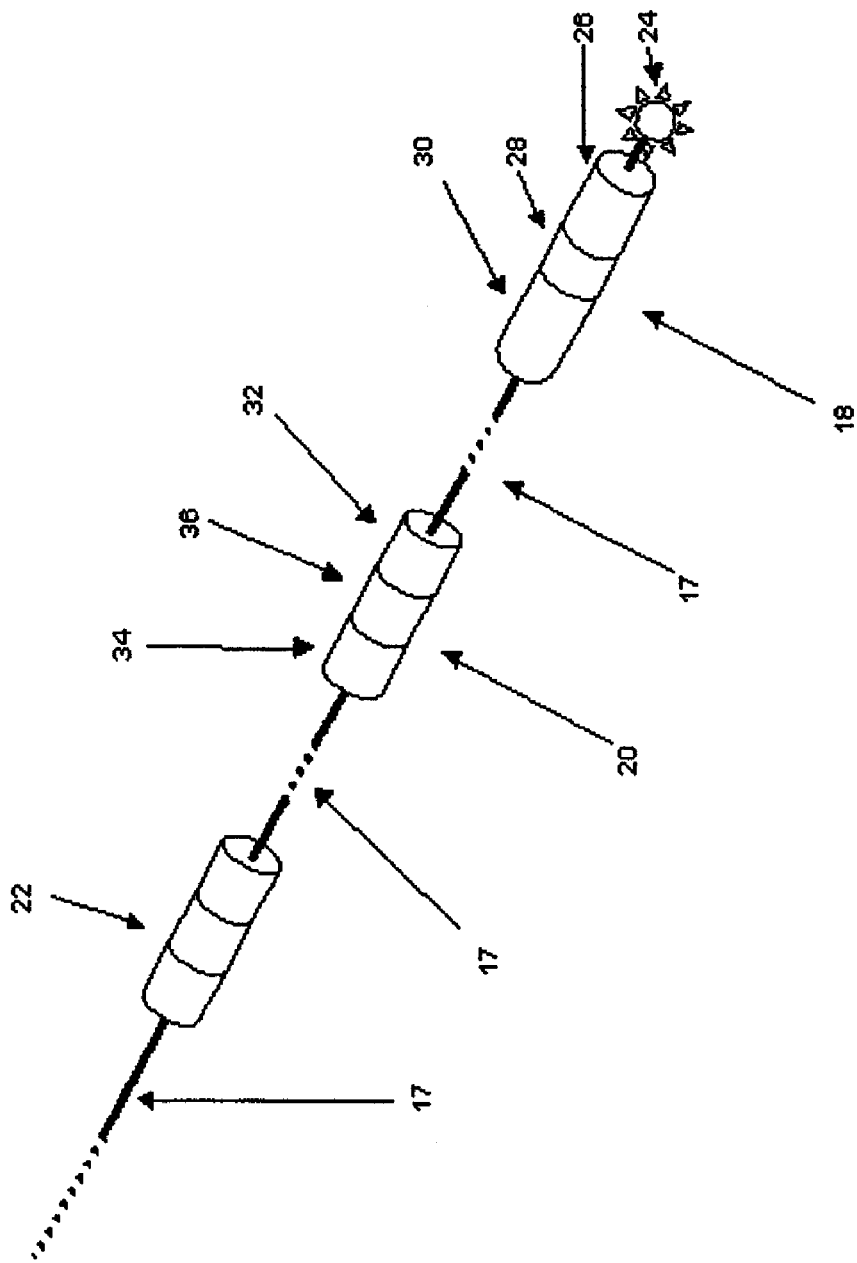
FIG. 2 shows a detailed view of the bottom hole assembly and two nodes as per FIG. 1 (Prior Art).

As shown in FIG. 2 (prior art), the bottom hole assembly 18 comprises a drill bit 24 (which may be instrumented), a downhole or 'mud' motor 26 to drive the drill bit 24, measurement-while-drilling (MWD) and/or logging-while-drilling (LWD) tool package 28, a primary transmitter 30 or optionally, instead of a mud motor, a rotary steerable system, drill collars, stabilizers or the like (not shown). Examples of such components will be known to the skilled worker. The MWD/LWD tool package, and primary transmitter may be integrated into a single unit and in direct communication. If a rotary steerable system is not used, steering may be accomplished by the bent-housing mud motor and drill bit making generally forward progress, while the MWD/LWD tools 28 communicate directional and other data to the surface receiver of the telemetry apparatus 14 via the primary transmitter 30, whereby the operator at the surface, and alter the operation of the motor such that a preferred direction of travel is achieved.

Node 20 intercepts the data from the primary transmitter 30 and relays it to either the receiver of the telemetry apparatus 14 at the surface (in one example), or may retransmit the data to a second node 22 further uphole and intermittent between the first node 20 and the receiver of the telemetry apparatus 14. Each of nodes 20, 22 comprise a telemetry receiver 32, a telemetry transmitter 34, and may also include a sensor package 36. The sensor package 36 may include MWD//LWD tools in the same manner as the MWD/LWD tools package 28 of the bottom hole assembly 18, or may have other functionalities. Inclusion of one or more such tools as part of a sensor package of a node enables data on the condition and environment at intervals along the wellbore to be transmitted to or from the surface.

Nodes 20 and 22 may have a simple repeater function, whereby the data from the downstream transmitter is merely received, amplified and retransmitted uphole. In some embodiments, a node may receive data in a first signal format, convert the received data from a first signal format to an electrical signal, convert the electrical signal to a second signal format, and retransmit the second signal format, thereby relaying the data uphole or downhole. Examples of such signal format interconversions are known in the art. For example, differing types of repeaters can be dispersed along the drill string, such as mud pulse and electromagnetic, or acoustic and electromagnetic, as exemplified by Ringgenberg et al in U.S. Pat. No. 6,177,882. Incorporation of additional nodes having repeater functionality enable wells to be drilled that may be deeper than the transmission range of a single node or primary transmitter alone.

Figure 3:
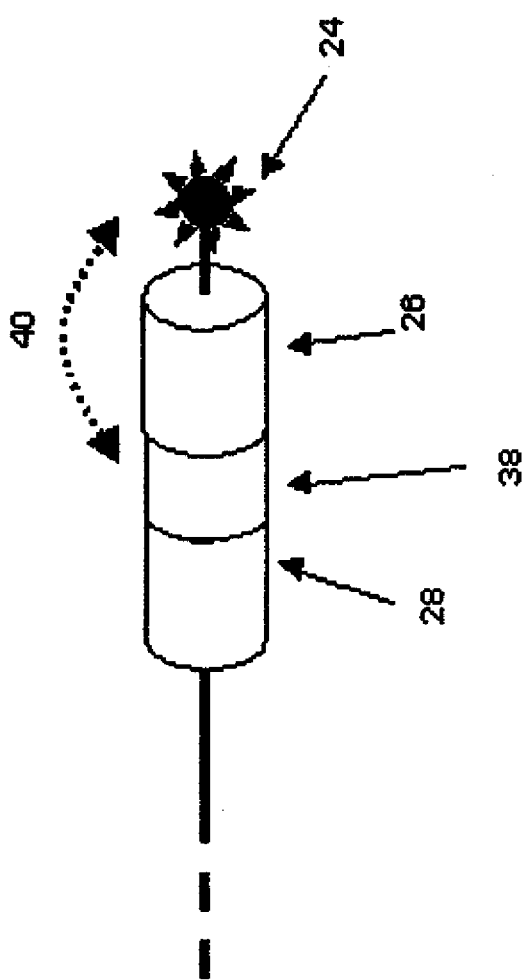
FIG. 3 shows an example of a data telemetry event (a 'short hop') between components of a bottom hole assembly (Prior Art).

FIG. 3 (prior art) shows an alternate arrangement of the bottom hole assembly. The drill bit 24 may be an instrumented drill bit, and include MWD tools to monitor the condition of the drill bit and its immediate environment. Data gathered by the sensors of the instrumented drill bit may be transmitted via telemetry—a 'short hop' 40- to a receiver 38 integrated, for example, in the sensor package 36. This data from the instrumented drill bit may then be added to that from the sensor package 36, conveyed to the primary transmitter 30 and transmitted up the drill string. Examples of instrumented drill bits and short hop communications between components of the bottom hole assembly are described in, for example U.S. Pat. No. 5,160,925 by Dailey et al.

In the embodiments of the disclosed technology described herein with reference to FIGS. 4 to 7, a system is provided that comprises a plurality of data transmission nodes situated along a drill string wherein at least one of the nodes includes a controller with a memory having encoded thereon a data transmission management algorithm. This algorithm when executed obtains, by a first node, a transmission status of a second node; then sends information from the first node to the second node if the transmission status of the second node indicates that the second node is capable of properly relaying the information along the drill string. If the transmission status of the second node indicates that the second node is incapable of properly relaying the information along the drill string, then the algorithm obtains, by the first node, a transmission status of a third node; and sends information from the first node to the third node for relaying along the drill string if the transmission status of the third node indicates that the third node is capable of properly relaying the information along the drill string.

The nodes in this system may have a plurality of functionalities that may be independent or integrated with other functionalities of the nodes. For this embodiment, the nodes may be the same or may have different functionalities. Examples of such functionalities include MWD/LWD tools and sensors, transmitter, receiver, transceiver, amplifier, electromagnetic to acoustic signal transformation, acoustic to electromagnetic signal transformation, and the like.

Figure 4:
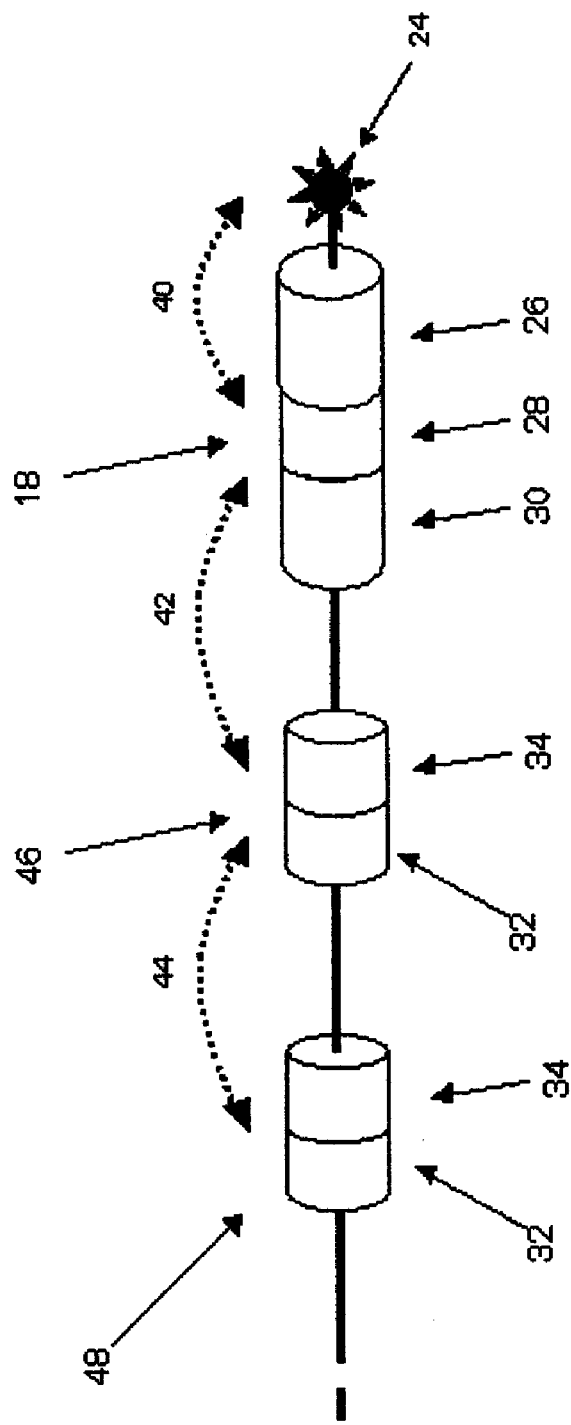
FIG. 4 is a schematic illustration of a data transmission system comprising a plurality of data transmission nodes having a computer readable memory programmed with a data transmission management protocol according to one embodiment of the disclosed technology.

A first embodiment of the disclosed technology is illustrated in FIG. 4. In this Figure, the bottom hole assembly 18 comprises a drill bit 24, a mud motor 26, a sensor package comprising MWD/LWD tools 28, a receiver and a primary transmitter 30, in wireless communication with a first node 46 (shown as a "telemetry hop" 42 arrow in this Figure). The first node 46 comprises a sensor package (not shown), a telemetry receiver/transmitter 32/34 having a controller with a memory having encoded thereon the data transmission management algorithm. A second node 48, which is adjacent the first node 46, also comprises the same sensor package (not shown) and a telemetry receiver/transmitter 32/34 which is in wireless communication with node 46 via a telemetry hop 44. Additional nodes (not shown) having the same components as the first and second nodes are located upstring in a spaced manner. Execution of a data transmission management protocol by these nodes 46, 48 etc. will be described in detail below.

The physical separation distance between any two adjacent nodes may depend on the functionality of the node, the format of the data to be transmitted, the telemetry method used, and the signal strength the node can transmit.

Generally, sensor packages or tool packages comprising MWD/LWD tools may be disposed within the bottom hole assembly or in nodes along the drill string. As described, the complement of each sensor package or tool package does not have to be identical according to the various embodiments of the disclosed technology, and may be selected to monitor particular ranges of parameters. The bottom hole assembly and the various nodes may be in physical communication via wires, fiber optic cables or the like, or may be in wireless telemetry communication. Wireless telemetry communication methods include mud-pulse, electromagnetic, acoustic, seismic, and the like, as previously described. In some embodiments a combination of physical and wireless telemetry communication techniques may be employed within the same system, to facilitate communication of the data obtained downhole to the surface, and also to convey information from the surface transmitters to the nodes and bottom hole assembly.

Telemetry communication hops may be unidirectional or bidirectional.

Figure 5:
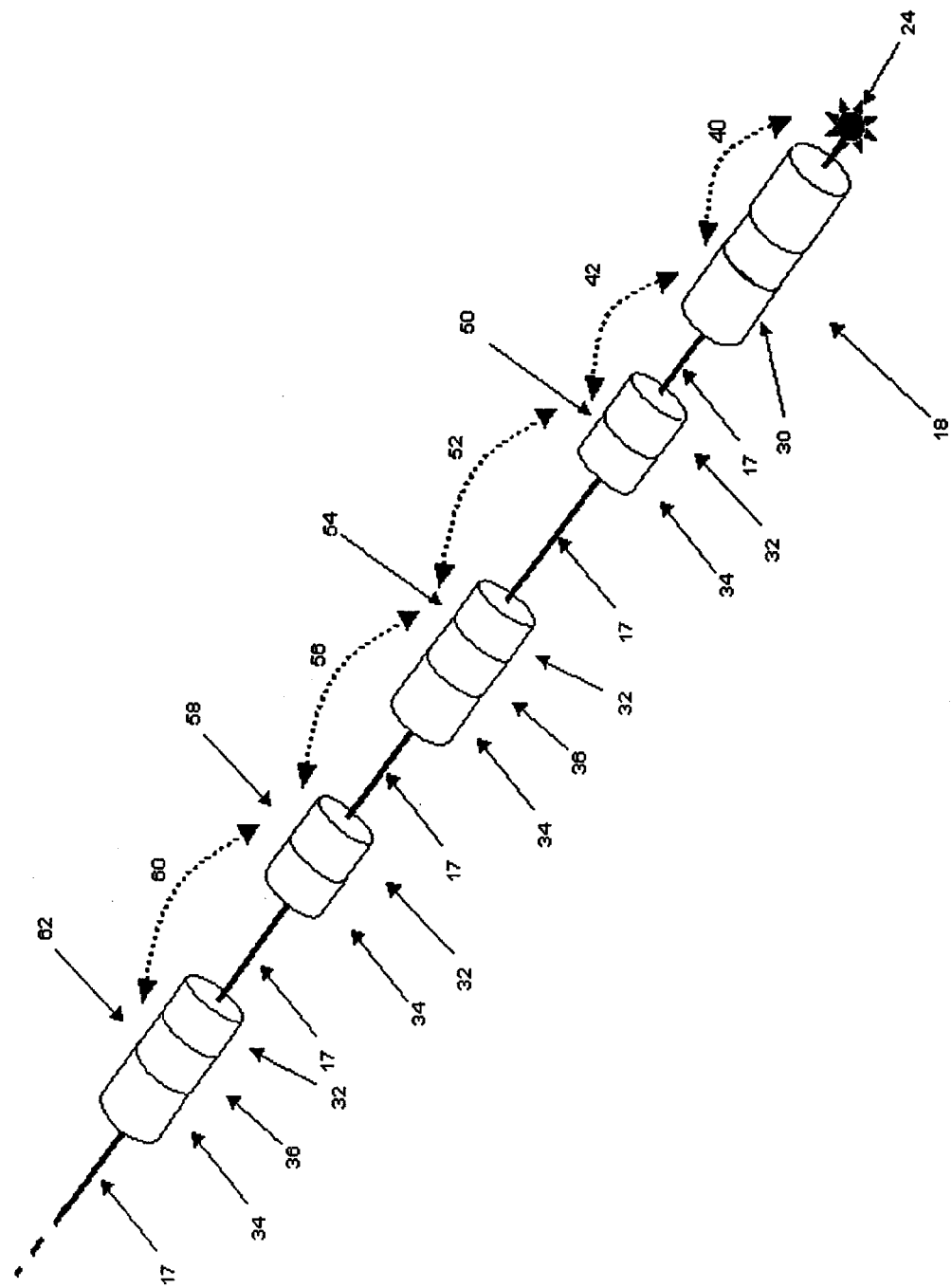
FIG. 5 is a schematic illustration of a data transmission system comprising a plurality of data transmission nodes having a computer readable memory programmed with a data transmission management protocol according to another embodiment of the disclosed technology.

A second embodiment of the system is shown in FIG. 5. As shown in FIG. 5, nodes having sensor tool packages like those nodes shown in FIG. 4 are interspersed with nodes having only repeater functionalities. Data gathered by the MWD/LWD tool package 28 or the instrumented drill bit 24 of the bottom hole assembly 18 is forwarded by the primary transmitter 30 to the receiver 32 of a first node 50 via a wireless hop 42. In this embodiment, the first node 50 is a repeater, and has a receiver/transmitter with processor, but does not have a sensor package. The first node 50 amplifies and retransmits the data via a wireless hop 52 to a second node 54 having a sensor package 36 as well as a transmitter and receiver 32, 34. Data received via hop 52 is added to the data gathered by sensor package 36 of second node 54, and this cumulative data is subsequently transmitted via wireless hop 56 to third node 58, which is a repeater in the same manner as first node 50. The cumulative data is retransmitted via wireless hop 60 to the next receiver—in this case, fourth node 62. New data gathered by the sensor package 36 of fourth node 62 is added and retransmitted in the same manner, to the next node in the system, or up to the surface receiver of the telemetry apparatus 14 at the surface.

It will be apparent to a skilled worker that a plurality of combinations of nodes are contemplated as embodiments of the disclosed technology, and are not to be limited by the illustrated examples. Sensor packages may be incorporated into some, all or none of the nodes.

In a system such at that described above and illustrated in FIGS. 4 and 5, data is transmitted uphole or downhole in an orderly manner, one hop after the other. If a node fails, however, data transmission in a conventional drill string will be delayed or disrupted altogether, leaving the operator at the surface blind to the downhole conditions, and unable to communicate with the bottom hole assembly. In contrast, the system according to the described embodiments is provided with a data transmission management protocol in the form of an algorithm stored on a controller with memory of one or more of the nodes in the system.

Figure 6:
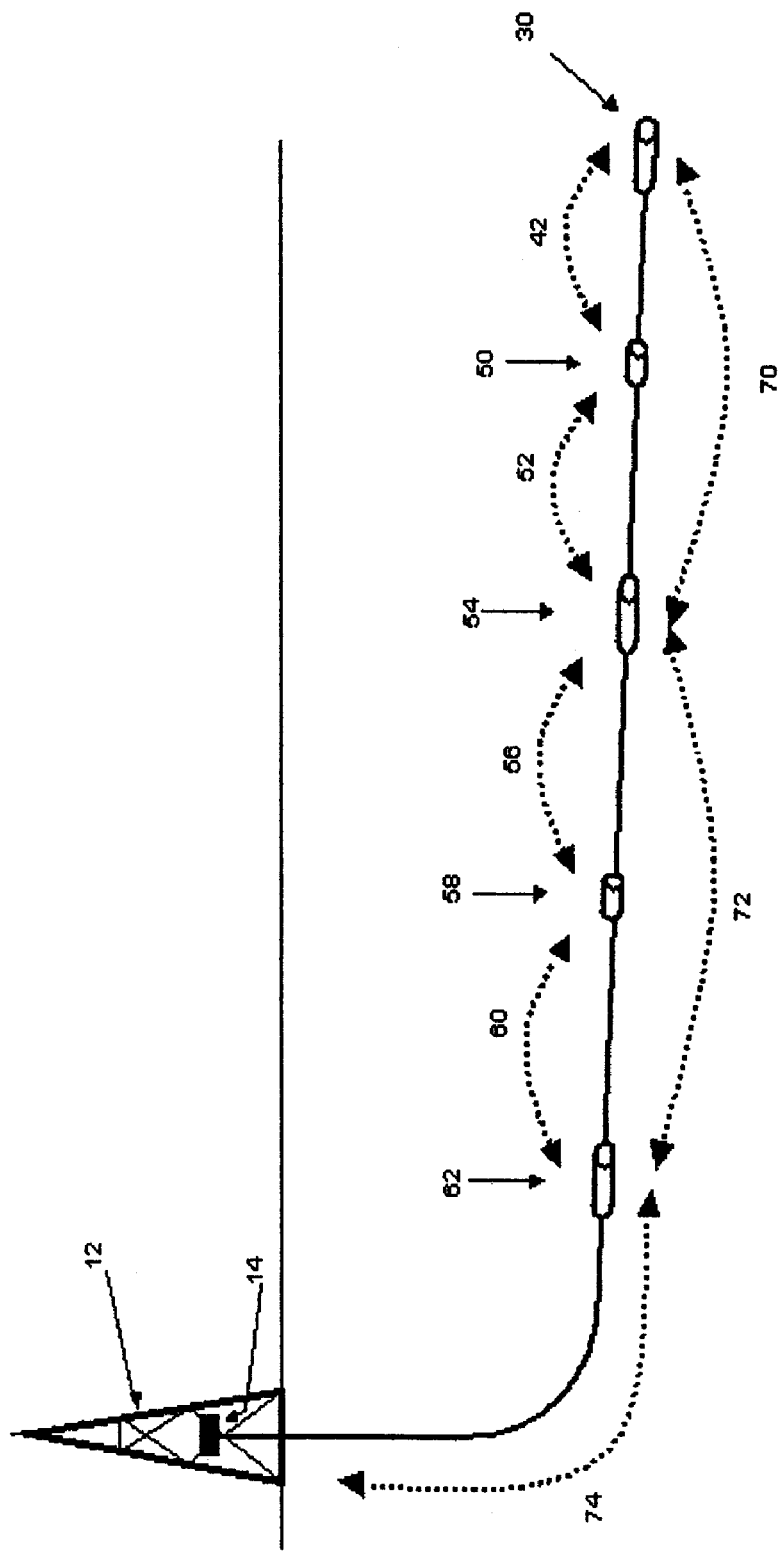
FIG. 6 shows a larger scale view of the system of FIG. 5, illustrating "long hop" telemetry events.

FIG. 6 illustrates the operation of the data transmission management protocol of the system. Data from the four nodes (50, 54, 58, 62) and the primary transmitter 30 of the bottom hole assembly 18 can be transmitted between nodes not only in a sequential manner (from one adjacent node to another), but by any path comprising at least two nodes and one "hop", whether the two nodes are adjacent or not, to reach the surface telemetry apparatus 14. Each node is capable of bidirectional data receiving and transmission. Further, each node is in communication with at least an adjacent uphole and downhole node. FIG. 6 illustrates multiple paths that may be followed to transmit the data from the primary transmitter 30 to the surface telemetry apparatus 14. In the event of a node failure that prevents the most direct transmission as illustrated in FIG. 5, an alternate transmission route can be used.

A "node failure" or a "failed node" may be defined generally as any node performance below a performance threshold. For example, a catastrophic failure of a node is a node that is permanently unable to communicate; other node failures may be recoverable and may be dependent on the surrounding environment (geologic strata, fluid or gas surrounding the node or the like) that adversely affects node performance. In some examples of operation by the data transmission management protocol, such a node failure may be overcome by, for example, increasing the power output of a nearby node, or bypassing such a node for telemetry purposes until it is removed from the adverse surrounding environment (i.e. the drillstring advances in the borehole and repositions the node accordingly). Other examples could include a reduced power output due to a depleting battery, a partial failure of an instrument sensor or sensors, a reduction in receive sensitivity, a temporary electronic circuit failure due to traversing a formation hot-spot, and the like.

To facilitate both the identification of a failed node and determination of an alternate data transmission route, each node incorporates a unique identifier such as a unique address tag. In another example, a status tag may be inserted in each transmission packet. For example, a status tag may be a digitally coded confirmation that the battery supply of the node was viable, the node was receiving all expected locally-transmitted data packets, the node was producing the expected power output in each of its transmissions, or the like. Such node system performance measurements, when compared against a predetermined list provide a 'health status' of a node referring to its optimal functionality, and may be indicated by for example, a digital status string that encapsulates all the status symbols for a specific node.

A receiving node monitors the status string of originating nodes for each data package received. Nodes may also send periodic status strings to adjacent nodes in the absence of a data package, or may be passive and send a status string report only in response to a query. Such a status report would comprise at least the information pertinent to the originating node. Such strings may also be concatenated as the telemetry messages make their way uphole, thereby informing each successive node and ultimately the surface operator the complete status situation of the entire downhole tool. To preserve the telemetry payload for the data, a status string may be sent only periodically, rather than with every data transmission, or, in the event of a significant failure, according to a predetermined protocol.

In the event of a failure or a sub-optimal performance of a node (reflected in its status report), a signal enhancement may be implemented to circumvent a problematic node. For example, an adjacent node may implement an alternate routing configuration to circumvent the problematic node. If a node failed, adjacent nodes may confirm the failure by communication attempts. Failed communication attempts (the number may be set as low as one, alternately the system may require more than one failed communication attempts before implementing a signal enhancement, such as implementing an alternate route, or altering the system parameter, for example increasing transmission power. Implementation of an alternate route may require, for example, an increase in transmitter power to a level that restores the inter-node communication. The increased transmitter power enables a 'long hop'. As illustrated in FIG. 6, long hops 70, 72 transmit the data package from the primary transmitter 30 to node 54 and/or from node 54 to node 62, thereby bypassing nodes 50 and 58. In the example show, a long hop 74 also transmits the data package from node 62 to the telemetry apparatus 14 at the surface. Carried in the data package is a unique identifier and status of each node in the system—this is relayed to the operator at the surface, and enables modifications to the system to be made. It is not necessary in all cases to implement a signal enhancement by increasing power in order to establish a longer telemetry hop—for example, the signal enhancement may comprise reducing the data rate by increasing the time over which a data 'bit' was transmitted, thereby utilizing an increased signal to noise ratio (SNR) at a given receiver and thereby enabling reception over a greater range. In another example of signal enhancement, telemetry transmission may be halted until a relatively quiet period in the drilling when an increase in SNR naturally occurs, sending the data in a burst mode for a similar range enhancement. As is known to those skilled in the art there are a number of other circumstance-dependent techniques available in order to increase transmission range that equivalently enhance or extend detection range from a transmitting node to a receiving node—we cite transmitter power increase only as illustrative example of signal enhancement.

This ability of the system to self-repair by implementing alternate transmission routes or changing various telemetry parameters may be generally referred to as 'self-healing'. A general example of a self-healing method for real-time telecommunication network applications is described by Grover et al (1991. IEEE Journal on Selected Areas in Communication 9(1): 112-125), however the downhole environment places additional demands on a self-healing system. Parallel routing is not available along a drill string, and the network restoration solution is restricted to a one-dimensional approach. Grover teaches a self-healing method involving a relatively arbitrary mesh—a simplification of this system may include the reduction to a set of rings, some or all of which may overlap. Another simplification may be to collapse the rings to end-connected lines, similar to the situation encountered downhole with nodes situated along a drillstring. The main difference is associated with the reduction in alternate traffic routes in going from a general mesh to a general line, thus the methodology of Grover may be applied, for example, in a restricted manner as described.

Failure of a node having a sensor package may result in the loss of that data from the data package transmitted uphole. While this data may be lost, the identification of the failure of the node is discernable from the status information transmitted, and appropriate action may be taken by the operator at the drill rig site.

In the event that more than one node fails, alternate routes are still possible. As each node illustrated in FIG. 6 is capable of bidirectional communication, data can be transmitted 'backwards' to a functioning node and transmitted around a failed node by a long hop transmission. Building on the example of FIG. 6, if, for example, node 54 failed, the data package received by node 50 from the primary transmitter 30 could be transmitted back to the primary transmitter 30 and retransmitted via a long hop (not shown) to node 58 or 62, and the data packages retransmitted uphole from there.

It will be apparent to a skilled worker that there are multiple transmission paths that may be employed in the self-healing systems according to various embodiments of the disclosed technology, involving combinations of nodes and long and/or short hops in an uphole and/or downhole direction to achieve the end result of transmitting data from the sensor and tool packages along the drill string to the telemetry apparatus 14 at the surface. It will also be apparent to a skilled worker that data transmission downhole from the telemetry apparatus 14 at the surface to the bottom hole assembly 18 may be accomplished in a similar manner, involving various combinations of nodes and long and/or short hops in both an uphole and/or downhole direction to achieve the downhole transmission.

A self-healing system is capable of responding to failures as they occur, without requiring a pre-programmed or predetermined response, although for some failures such responses may be included in systems according to some embodiments of the disclosed technology. Self-healing telemetry links allow drilling to continue under less than optimal communication conditions.

Figure 7:
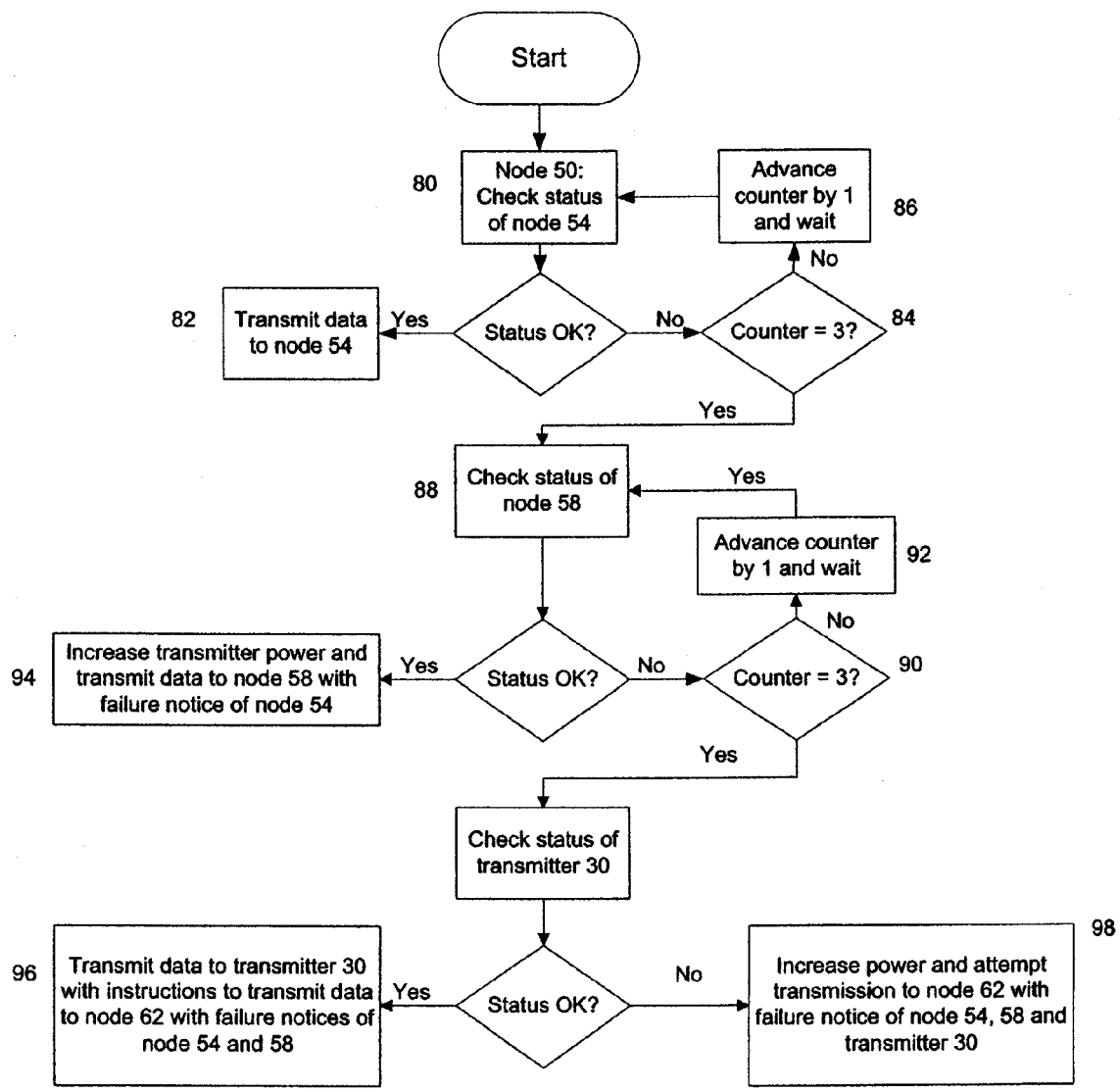
FIG. 7 is a flow chart of a data transmission management protocol programmed in a computer readable memory of a node in the systems shown in FIGS. 4 and 5.

FIG. 7 illustrates one exemplary operation of the data transmission management protocol programmed into the controller with memory of the nodes of the system shown in FIG. 6, using a simplified logic flowchart. In this example, a node 54 has failed but the primary transmitter 30 is still normally active and sensor node 50 is also active. At step 80, the controller in the node 50 activates the node's transmitter to query and confirm the status of node 54, the next upstream node in the drill string. If a positive status is received by the receiver of node 50, then in step 82 the controller activates the node's transmitter to transmit data telemetry to the next adjacent node via the shortest path (hop 52 as shown in FIG. 6).

If a negative status response from node 54 is received, node 50 attempts to re-establish the communication link to node 54. In this example, the controller is programmed with standing instructions to attempt communication three times before proceeding: a counter (step 84) and timer (step 86) are provided for this purpose. A confirmation query for health status is sent by node 50, and a positive status response would cause the node 50 controller to return to step 82 and continue from there. A negative status response causes the controller to proceed to step 88, where the controller of node 50 increases power output for the transmitter of node 50, and a communication link to node 58 is attempted (step 88). If this fails, the controller at step 92 instructs that this link be attempted three times (steps 90, 92). If communication is established, the controller of node 50 instructs the node's transmitter to send a confirmation query for status; if a positive status response is received by node 50, the controller for node 50 then instructs the node's transmitter to transmit a data package to node 58 (step 94). Additionally, in step 94, the controller for node 50 includes in the data package an alert that node 54 has failed, and that node 50 is compensating for the failure (increased transmission power to sent telemetry a greater distance to the next node, for example).

If node 58 fails to confirm a communication link, the controller of node 50 queries the status of transmitter 30. If transmitter 30 responds with a positive status report, then controller for node 50 sends the data package to transmitter 30 along with instructions to establish connection with node 62 and to send the data package to node 62 along with an alert notice of the failure of nodes 54 and 58 (step 96). If transmitter 30 fails to respond with a positive status report, then controller for node 50 instructs the node's transmitter to boost power and attempt to establish communication with node 62. If communication is established, then the transmitter for node 50 transmits to node 62 the data package along with an alert notice of the failure of nodes 54 and 58 (step 98).

It is expected that the above protocol will establish communication between node 50 and one of nodes 54, 58, 62 and transmitter 30 and the power specification for the transmitter of node 50 can be selected to reach these nodes. Of course, the power output of the transmitter for node 50 can be increased thereby increasing the nodes within communication range, and the above protocol can be modified so that node 50 continues to query the status of nodes within range until a communication link is successfully established and data telemetry may occur in the uphole direction.

Telemetry may be beneficially sent between nodes in the net downhole direction for purposes associated with closed loop control, efficient usage of transmit power for a specific node (e.g. if a low powered sensor node is preferentially sends data downhole to a repeater node that subsequently incorporates this data into a message that is sent preferentially uphole), and the like.

In another embodiment, the nodes and/or the bottom hole assembly comprise data storage capability. Data collected by sensor packages or MWD/LWD tools may optionally be stored for later retrieval when the drill string is removed from the wellbore, for example, in the event that there is a general failure of the telemetry system. Such a general failure may occur when a number of adjacent nodes all fail, and the closest functioning nodes do not have sufficient transmitter power to communicate. This situation may occur for a number of reasons—for example, due to severe vibration caused by drill-string whirl, or an excessive local temperature caused by ingress of hot formation fluids into the wellbore.

In another embodiment, the nodes may be stationed at various places along the drillstring such that, in the case of sensor nodes, formation parameters that would have a time-based importance may be assessed. For example, if the well passed through two producing formations it may be useful to assess what was happening in an upper formation while drilling through a lower one. In the case of repeater nodes, for example, positions may be chosen to optimize the efficient use of transmitter power consistent with adequate signal being achieved at each station, and in particular at the surface where noise interference is likely to be greatest. Repeater nodes may be positioned such that the effect of formations that are likely to attenuate the passage of telemetry may be offset with shorter hops.

Node power sources. While tools located in the bottom hole assembly may be powered by the mud motor that drives the drill bit, alternator-turbines and batteries may be used to provide power to the transmitters, receivers and sensor or tool packages both at the bottom hole assembly and at the nodes along the drill string. To conserve power, transmitters and receivers may operate at a default low or minimal power output. Only in the even that a self-healing protocol is implemented to bypass a failed node would the transmission power be increased.

Self-healing telemetry routes. Illustrative telemetry hops shown in FIGS. 4, 5 and 6 are shown as contiguous for the purposes of examples. One skilled in the art will recognize that this restriction is not required—the amplitude of any telemetry hop may be altered in order to bypass one or more nodes uphole or downhole from the point of transmission. Protocols may be implemented such that an optimized routing may be established to maximize the transmission of drilling data to the surface. As it is not known which node or nodes will fail, a self-healing approach enables the system to respond as needed.

All citations are herein incorporated by reference.

One or more currently preferred embodiments have been described by way of example. It will be apparent to persons skilled in the art that a number of variations and modifications can be made without departing from the scope of the invention as defined in the claims.

We claim:

1. A method for transmitting information using a plurality of data transmission nodes situated along a drill string, comprising
   (a) obtaining a transmission status of a second downhole node by a first downhole node;
   (b) when the transmission status of the second node indicates that the second node meets a selected performance threshold, sending the information from the first node to the second node; and
   (c) when the transmission status of the second node indicates that the second node does not meet its performance threshold, then
      (i) obtaining a transmission status of a third node by the first node; and
      (ii) when the transmission status of the third node indicates that the third node meets a selected performance threshold, transmitting the information from the first node to the third node for relaying along the drill string.

2. A method as claimed in claim 1 further comprising the step of when the transmission status of the third node indicates that the third node does not meet its performance threshold, then (a) obtaining a transmission status of an Nth node by the first node, the Nth node having at least as many nodes interposed between itself and the first node as there are nodes interposed between the first node and the third node;

(b) when the transmission status of the Nth node indicates that the Nth node meets a selected performance threshold, transmitting information from the first node to the Nth node for relaying along the drill string.

3. A method as claimed in claim 2 wherein at least one of the data transmission nodes comprises a sensor package for obtaining data on a wellbore surrounding the drillstring, the node having the sensor package adding the data to the information being relayed along the drill string for transmission along the drill string.

4. A method as claimed in claim 3 wherein at least one of the nodes that comprises a sensor package also comprises data storage capability for storing data obtained using the sensor package.

5. A method as claimed in claim 2 wherein the transmission status of the second node comprises a unique address tag and a status tag.

6. A method as claimed in claim 5 wherein each node adds its own transmission status to the information being relayed along the drill string for transmission along the drill string.

7. A method as claimed in claim 5 wherein the status tag consists of information selected from the group of whether the battery supply of the second node is viable, whether the node is receiving all expected data, and whether the power output of the node is sufficient.

8. A method as claimed in claim 5 wherein the step of obtaining a transmission status of the second node by the first node comprises spontaneously and periodically sending to the first node the transmission status of the second node by the second node.

9. A method as claimed in claim 5 wherein the step of obtaining a transmission status of the second node by the first node comprises
   (a) periodically requesting, by the first node, the transmission status of the second node; and
   (b) in response to periodic requests, sending to the first node, from the second node, the transmission status of the second node.

10. A method as claimed in claim 2 wherein the first node is adjacent to the second node and to the third node on the drill string.

11. A method as claimed in claim 2 wherein the first node is adjacent to the second node on the drill string, and the third node has at least one node interposed between it and the first node on the drill string.

12. A method as claimed in claim 1 wherein one of the first or second nodes is below its selected performance threshold when the node is unable to communicate, or when the power output of the node falls below a selected level, or when the node detects a failure in one or more sensors in the node, or when the node detects a temporary electronic circuit failure.

13. A method as claimed in claim 1 wherein the step of sending the information from the first node to the third node comprises increasing the transmitter power of the first node to a level that a transmission by the first node is receivable by the third node.

14. A method as claimed in claim 1 wherein the step of sending the information from the first node to the third node comprises increasing the time of which each data bit is transmitted in a transmission by the first node to the third node.

15. A method as claimed in claim 1 wherein the step of sending the information from the first node to the third node comprises waiting for a period during drilling where there is a naturally occurring increase in the signal to noise ratio of communications sent between the first node and the second node as compared to other periods during drilling, then transmitting the information by the first node to the third node.

16. A method as claimed in claim 1 wherein the step of sending the information from the first node to another node is carried out by one of acoustic telemetry, mud pulse telemetry, and electromagnetic telemetry.

17. A method as claimed in claim 1 wherein the step of obtaining the transmission status of another node by the first node is carried out by one of acoustic telemetry, mud pulse telemetry and electromagnetic telemetry.

18. A drill string comprising a plurality of data transmission nodes situated along the drill string wherein at least one of the nodes is a downhole node that includes a controller with a memory having encoded thereon an algorithm that performs the following steps:

(a) obtaining a transmission status of a second downhole node by a first downhole node;

(b) when the transmission status of the second node indicates that the second node meets a selected performance threshold, transmitting information from the first node to the second node; and (c) when the transmission status of the second node indicates that the second node does not meet a selected performance threshold, then
   (i) obtaining a transmission status of a third node by a first node; and
   (ii) when the transmission status of the third node indicates that the third node meets a selected performance threshold, transmitting information from the first node to a third node for relaying along the drill string.

19. A drill string as claimed in claim 18 wherein the algorithm encoded on the memory further comprises the step of when the transmission status of the third node indicates that the third node does not meet its selected performance threshold, then (a) obtaining a transmission status of an Nth node by the first node, the Nth node having at least as many nodes interposed between itself and the first node as there are nodes interposed between the first node and the third node;

(b) when the transmission status of the Nth node indicates that the Nth node meets a selected performance threshold, transmitting information from the first node to the Nth node for relaying along the drill string.

20. A data transmission downhole node for conveying information along a drill string comprising:
   a transmitter for transmitting information to another node,
   a receiver for receiving a transmission status of another node, and
   a controller with a memory having encoded thereon an algorithm that performs the following steps:

(a) reading a transmission status of a second downhole node received by the receiver;

(b) when the transmission status of the second node indicates that the second node meets a selected performance threshold, instructed the transmitter to transmit information to the second node; and (c) when the transmission status of the second node indicates that the second node does not meet its selected performance threshold, then
   (i) reading a transmission status of a third node received by the receiver; and
   (ii) when the transmission status of the third node indicates that the third node meets a selected performance threshold, instructing the transmitter to transmit information to the third node for relaying along the drill string.

21. A data transmission node as claimed in claim 20 wherein the algorithm encoded on the memory further comprises the step of
when the transmission status of the third node indicates that the third node does not meet its elected performance threshold, then
(a) reading a transmission status of an Nth node received by the receiver, the Nth node having at least as many nodes interposed between itself and the first node as there are nodes interposed between the first node and the third node;
(b) instructing the transmitter to transmit information to the Nth node for relaying along the drill string when the transmission status of the Nth node indicates that the Nth node meets its selected performance threshold.

* * * * *